US010228879B1

(12) United States Patent
Peleg et al.

(10) Patent No.: US 10,228,879 B1
(45) Date of Patent: Mar. 12, 2019

(54) SYSTEM AND METHOD FOR BACKUP AND RESTORE OF OFFLINE DISKS IN MAINFRAME COMPUTERS

(71) Applicant: MODEL9 SOFTWARE LTD., Kiryat-Ono (IL)

(72) Inventors: Gil Peleg, Kiryat-Ono (IL); Offer Baruch, Gannei Tikva (IL); Dori Polotsky, Tel-Aviv (IL); Tomer Zelberzvig, Rehovot (IL)

(73) Assignee: MODEL9 SOFTWARE LTD., Kiryat Ono (IL)

( * ) Notice: Subject to any disclaimer, the term of this patent is extended or adjusted under 35 U.S.C. 154(b) by 0 days.

(21) Appl. No.: 16/025,181

(22) Filed: Jul. 2, 2018

(51) Int. Cl.
*G06F 12/00* (2006.01)
*G06F 3/06* (2006.01)

(52) U.S. Cl.
CPC ............ *G06F 3/065* (2013.01); *G06F 3/0619* (2013.01); *G06F 3/0644* (2013.01); *G06F 3/0673* (2013.01)

(58) Field of Classification Search
CPC ...... G06F 3/065; G06F 3/0619; G06F 3/0644; G06F 3/0673
See application file for complete search history.

(56) References Cited

U.S. PATENT DOCUMENTS

| 10,055,311 | B1* | 8/2018 | Troyan | G06F 11/1469 |
| 2008/0072003 | A1* | 3/2008 | Vu | G06F 3/0617 711/162 |
| 2015/0286426 | A1* | 10/2015 | Dain | G06F 3/0619 711/103 |
| 2015/0286428 | A1* | 10/2015 | Dain | G06F 3/0619 711/103 |
| 2015/0286434 | A1* | 10/2015 | Dain | G06F 11/14 711/103 |

* cited by examiner

*Primary Examiner* — Prasith Thammavong

(57) ABSTRACT

Methods, system and computer program product for backup and restore of mainframe computer, the method for backup comprising: receiving a request for backing up a mainframe volume associated with a mainframe computer, the mainframe volume operating in the Count Key Data (CKD) architecture, the mainframe volume having a volume serial number, referred to as a volume name; taking a snapshot of the volume, thereby creating an offline copy of the volume; generating a temporary name for the offline copy, the temporary name different from the volume name; reformatting the offline copy to change its name to the temporary name; storing in a repository at least the name and the temporary name; bringing the offline copy with the temporary name to an online state; and backing up the copy to an external storage.

13 Claims, 2 Drawing Sheets

SYSTEM AND METHOD FOR BACKUP AND RESTORE OF OFFLINE DISKS IN MAINFRAME COMPUTERS

TECHNICAL FIELD

The present disclosure relates to mainframe computers in general, and to a system and method for backing up mainframe disks in offline state, in particular.

BACKGROUND

Backing up computers is an important task in the everyday operation of computer systems. Backup may be required for retrieval of information in cases of human errors, technical failures, upgrades, or the like, as well as for legal or operational reasons.

A disk, also referred to as a volume, in a mainframe (MF) operating system, has a proprietary architecture called Count Key Data (CKD) that dictates the disk name, such that the disk name is part of its architecture and is not dictated by the MF operating system. The volume can be in either online state or in offline state. In online state, the operating system and applications can access the disk for reading and/or writing data. When in offline state, no application can read or write information from the disk.

Each disk is identified by a 6-character volume serial number, referred to as a volume name. The MF operating system does not allow more than one volume with the same name to be in online state at the same time. Trying to bring online a disk with a duplicate volume name, makes the second disk declared as a duplicate and placed back in offline state.

In mainframe (MF) systems, backing up a disk, for example, using the DUMP FULL command of the Data Facility Storage Management Subsystem Data Set Services (DFSMSdss) system utility requires the volume to be in an online state.

Backup of a volume may take significant amount of time, for example a few hours. This limits the ability of an MF operator to create frequent backups, since the time it takes to create a backup may be longer than the required gap between backups. For example, an organization may require that a backup is created every two hours, such that in case of failure no more than two hours of work are lost. However, if creating a backup takes four hours to complete, such requirement cannot be complied with.

Additionally, the long time required for backing up a volume may also lead to the creation of low-integrity backups, as some of the data may have changed between when a backup started and when it ended, thus possibly creating inconsistency.

To overcome the problems of insufficient frequency of backup copies and inconsistent backups, a common practice is to create an identical copy of one or more volumes within the same disk storage system before initiating a backup for the volumes. The identical copy within the same storage system is referred to as a snapshot. Since snapshots are volume copies created within the same storage system instead of on an external storage, they are much faster to create in compare to backup copies, for example a few seconds, thus providing consistency.

However, due to the large storage capacity required for keeping snapshots, relying solely on snapshots as a backup mechanism does not allow keeping sufficient number of backup versions to provide sufficiently frequent recovery points. Therefore, it is common to combine snapshots with backups, such that the snapshots are used to create consistent copies in a timely manner, while backup of the snapshot copies is used to create multiple backup versions that can be stored on less expensive storage media such as cloud storage or tapes.

However, a snapshot volume behaves exactly as any other volume in a mainframe system. In order to initiate a backup of a snapshot volume, the snapshot has to be in an online state. As detailed above, the snapshot, which is an identical copy of the original volume, cannot be brought online without putting the original volume in offline state, since their names are identical.

BRIEF SUMMARY

One exemplary embodiment of the disclosed subject matter is a computer-implemented method comprising: receiving a request for backing up a mainframe volume associated with a mainframe computer, the mainframe volume operating in the Count Key Data (CKD) architecture, the mainframe volume having a volume serial number, referred to as a volume name; taking a snapshot of the volume, thereby creating an offline copy of the volume; generating a temporary name for the offline copy, the temporary name different from the volume name; reformatting the offline copy to change its name to the temporary name; storing in a repository at least the name and the temporary name; bringing the offline copy with the temporary name to an online state; and backing up the copy to an external storage. Within the method the external storage is optionally object storage. Within the method, the temporary name is optionally different from names of other volumes associated with the mainframe computer and from names of copies of volumes associated with the mainframe computer. The method is optionally performed by a Central Processing Unit (CPU) of the mainframe computer.

Another exemplary embodiment of the disclosed subject matter is a computer-implemented method comprising: receiving a request to restore a mainframe volume associated with a mainframe computer, the mainframe volume operating in the CKD architecture, the mainframe volume having a volume serial number, referred to as a volume name; searching a repository for the volume name to retrieve a temporary name; using the temporary name, restoring a volume from an external storage; and reformatting the volume to the volume name. Within the method the external storage is optionally object storage. Within the method, subject to availability of multiple backups for the volume, a required backup version is optionally selected by a user. Within the method, subject to the request comprising additional details of a backup, searching the repository optionally comprises searching for an entry complying with the name and with the additional details. The method is optionally performed by a Central Processing Unit (CPU) of the mainframe computer.

Yet another exemplary embodiment of the disclosed subject matter is a system for backup and restore mainframe data on a backup server, comprising: a mainframe processor, the mainframe processor being adapted to perform a first set of steps comprising: receiving a request for backing up a mainframe volume associated with a mainframe computer, the mainframe volume operating in the CKD architecture, the mainframe volume having a volume serial number, referred to as a volume name; taking a snapshot of the volume, thereby creating an offline copy of the volume; generating a temporary name for the offline copy, the temporary name different from the volume name; reformatting the offline copy to change its name to the temporary name; storing in a repository at least the name and the temporary name; bringing the offline copy with the temporary name to an online state; and backing up the copy to an external storage. Within the system, the steps are optionally performed by a CPU of the mainframe computer.

Yet another exemplary embodiment of the disclosed subject matter is a computer program product comprising a computer readable storage medium retaining program instructions, which program instructions when read by a processor, cause the processor to perform a method comprising: performing a backup operation, comprising: receiving a request for backing up a mainframe volume associated with a mainframe computer, the mainframe volume operating in the CKD architecture, the mainframe volume having a volume serial number, referred to as a volume name; taking a snapshot of the volume, thereby creating an offline copy of the volume; generating a temporary name for the offline copy, the temporary name different from the volume name; reformatting the offline copy to change its name to the temporary name; storing in a repository at least the name and the temporary name; bringing the offline copy with the temporary name to an online state; and backing up the copy to an external storage; and performing a restore operation, comprising: receiving a second request to restore the mainframe volume associated with the mainframe computer, the mainframe volume operating in the CKD architecture, the mainframe volume having the volume serial number, referred to as the volume name; searching the repository for the volume name to retrieve the temporary name; using the temporary name, restoring the volume from an external storage; and reformatting the volume to the volume name. Within the computer program product, the backup operation and the restore operation are optionally performed by a CPU of the mainframe computer.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
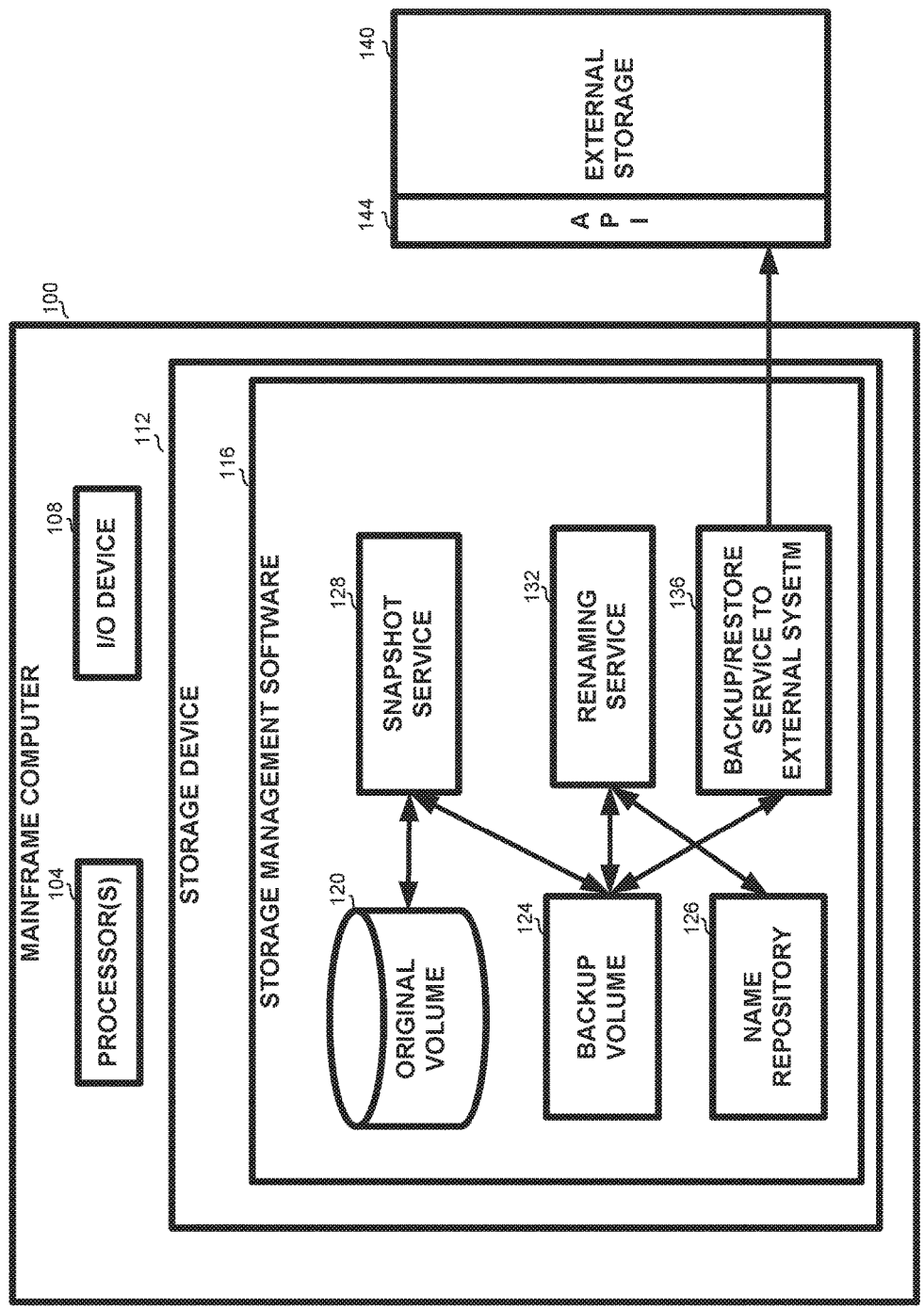
FIG. 1 is a block diagram of components in a mainframe computer in which volumes are backup up and restored to/from external storage, in accordance with some exemplary embodiments of the subject matter.

The disclosure relates to backing up and restoring data from and to a mainframe (MF) computer system.

Using traditional methods, backing up a volume takes a long time and significant volume.

Thus, one technical problem handled by the disclosure is the need to perform a fast backup of a volume, wherein the copy is of high integrity, and to ensure that in case of failure the worst case scenario is that work done during at most a predetermined period of time, for example 2-3 hours, is lost.

Another technical problem is the need to maintain a multiplicity of backups, such that the system can be restored to its state at a multiplicity of points in time.

Common practice used to overcome the problems of insufficient frequency of backup copies and inconsistent backups, uses snapshots, which are fast to create, for example a few seconds. However, snapshots require large volume and thus do not enable sufficiently frequent recovery points. Nevertheless, backing up a snapshot on less expensive storage media requires the snapshot to be in an online state, which requires putting the original volume in offline state.

Some software products exist which support backup of offline disks, such as CA-DISK and Innovation FDR. However, such products perform read operations from the offline disks by bypassing standard operating system protection mechanisms for offline volumes. These operations are not officially supported by the operating system, and may pose data integrity issues, because the storage controller keeps regarding the disk as being in offline state, and does not notify the system of events such as updates to the disk from other systems, as it would for online disks.

One technical solution comprises the usage of a snapshot mechanism to create a copy of a disk. Creating a snapshot is a fast and reliable process, and due to the short time it takes to create a snapshot, the snapshot is of high integrity. The snapshot copy has to be put in offline state, since it has the same volume name as the original volume which is in online state. A service may then be used for changing the name of the snapshot copy while in offline state, for example to a name generated in a manner than ensures uniqueness. The snapshot copy can then be brought online since it has a different name than that of the original disk. Once online, the copy can be backed up to an external storage device, and in particular to an open storage device, such as cloud storage.

Another technical solution relates to restoring a backup of a volume from an external storage such as object storage. The volume is restored to online state and assumes the same name with which it was created. The volume can then be renamed to assume its original name, such that it can be referred to and accessed as the original volume. The term renamed in mainframe systems is also referred to as 'reformatted', which means changing the volume's serial number.

One technical effect of the disclosure thus provides for the creation of high integrity backup copies of a volume, in a frequency which may be as high has required. Storing a multiplicity of backup copies is enabled due to the copies being moved to an external device, thus avoiding disk storage space limitations despite the significant volume taken by the backups.

Referring now to FIG. 1, showing a generalized block diagram of a mainframe computer in which volumes are backup up and restored to/from external storage.

A mainframe computer is a computer used primarily by large organizations for critical applications, bulk data processing, industry and consumer statistics, enterprise resource planning, transaction processing, or other tasks.

Mainframe 100 may comprise a processor 104. Processor 104 may be a Central Processing Unit (CPU), a microprocessor, an electronic circuit, an Integrated Circuit (IC), a Central Processor (CP), a System Z Information Integration Processor (zIIP), a System Z Application Assist Processor (zAAP), or the like. Processor 104 may be utilized to perform computations required by the apparatus or any of its subcomponents.

In some exemplary embodiments of the disclosed subject matter, mainframe 100 may comprise an Input/Output (I/O) device 108 such as a terminal, a printer, a tape, a disk, a network communications device, or the like. I/O device 108 may be utilized to provide output to and receive input from a user.

In some exemplary embodiments of the disclosed subject matter, mainframe 100 may comprise or be operatively connected to one or more storage devices 112. Storage device 112 may be or may comprise one or more hard disk drives, Flash disks, Random Access Memories (RAMs), memory chips, real storage, main storage or the like.

Storage device 112 may comprise or be otherwise operatively in communication with original volume 120, wherein it is required to back up the information stored on volume 120. The backup may be required to be performed every predetermined period of time, for example every 10 minutes, every hour, every two hours, twice a day, every day, or the like. Original volume 120 is assumed to be in online mode when it is backed up. The data stored within original volume 120 may be changed often, as one or more users may be writing or updating data stored thereon.

During the backup, a backup volume 124 may be created, which contains the same data as original volume 120 at the time original volume 120 was backed up.

In some exemplary embodiments, storage device 112 may retain program code operative to cause processor 104 to perform acts associated with any of the programs executed by mainframe 100. The components detailed below may be implemented as one or more sets of interrelated computer instructions, executed for example by processor 104 or by another processor. The components may be arranged as one or more executable files, dynamic libraries, static libraries, methods, functions, services, or the like, programmed in any programming language and under any computing environment.

Storage device 112 may store snapshot service 128, for example FlashCopy® in IBM® storage, ShadowImage® in Hitachi® storage or TimeFinder® in EMC® storage, for taking a snapshot of original volume 120, thereby creating backup volume 124 which is a copy of original volume 120. The snapshot service may be invoked directly by code executed by a processor of the mainframe computer.

Storage device 112 may store name handling and repository 126, for storing and retrieving names of original volumes backed up and corresponding names of backup copies. Repository 126 may comprise additional details for one or more copies, such as backup date and time, or the like.

Storage device 112 may store renaming service 132, configured to generate temporary and unique backup copy names for an original volume 120 being backed up, wherein the temporary name may be unique, such that it is different from all names of all volumes and from all names of all previously created backup volumes. Alternatively, names of backup copies may repeat, in order to overwrite previously created backups, for example after one week, one year, or the like. Renaming service 132 may store the original name and the temporary name, and optionally additional details in name repository 126.

Renaming service 132 may also be configured to receive a name of an original volume which it is required to retrieve, and fetch a temporary name of a backup copy of the original volume. If no further details are supplied, the name of the latest backup copy created for the original volume may be retrieved. Otherwise, if additional details such as backup date or time are provided, a name of a backup copy complying with the other details may be retrieved.

Storage device 112 may store backup/restore service to external system 136. Backup/restore service to external system 136 nay be configured to receive an online volume, and back it up to an external storage device 140. In particular, external storage device 140 may be an object storage. External storage device 140 may be accessed through application program interface (API) 144. Backup/restore service to external system 136 may also be configured for retrieving data from external storage device 140 through API 144. Backup/restore service to external system 136 may be implemented as detailed in patent application no. U.S. Ser. No. 14/800,743 filed Jul. 16, 2015, incorporated herein in its entirety and for all purposes.

Figure 2A:
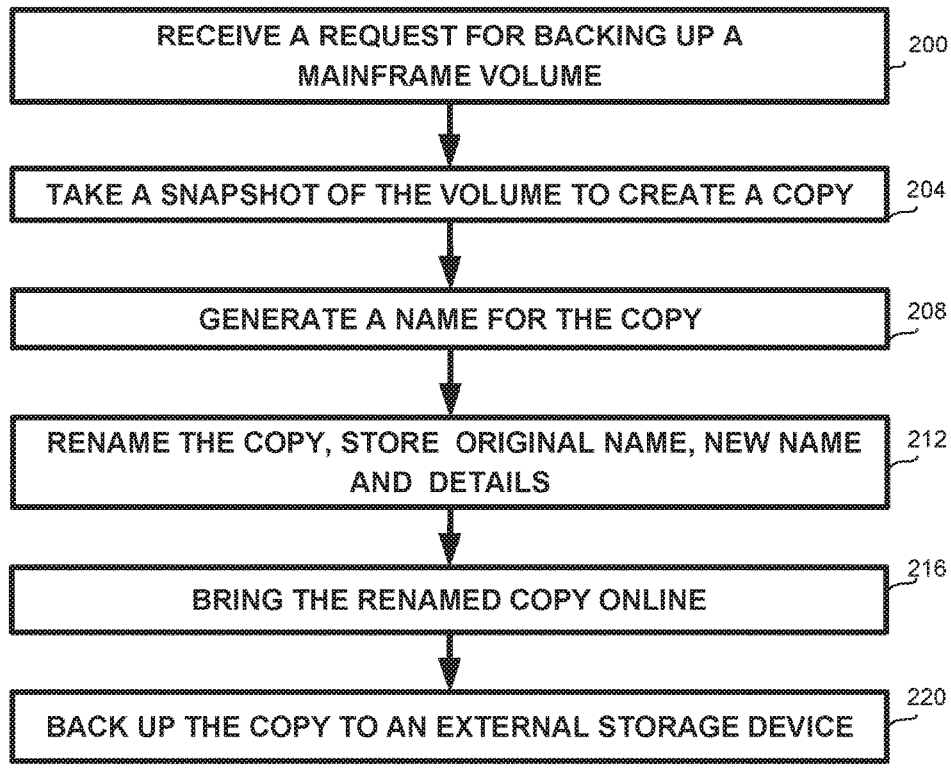
FIG. 2A is a flowchart of steps in a method for backing up a volume of a mainframe computer on an external storage, in accordance with some embodiments of the disclosure.

Referring now to FIG. 2A, showing a flowchart of steps in a method for backing up a volume of a mainframe computer on an external storage.

On step 200, a request for backing up an MF volume may be received. The request may be received from a user, from an automatic process that backs up volumes periodically, or the like. The request may include the name of the volume to be backed up.

On step 204, a copy of the volume may be taken, for example by snapshot service 128, to create an offline copy of the volume. The copy is an exact copy of the volume to be backed up, and thus has the same name as the volume, therefore it cannot be brought online since it clashes with the original volume. For example, in the IBM storage system, a snapshot copy, referred to as a FlashCopy, may be created using the FCESTABL command, as follows:
FCESTABL SDEVN(4813) TDEVN(6813) MODE(NO-COPY) ONLINTGT(YES)

On step 208, a name may be generated for the copy, for example by renaming service 132, such that the copy can be brought online together with the original volume. The name may be associated with, for example it may contain the original volume name, and possibly additional details such as the date and time of the backup. However, the name may also be arbitrary. The name may be unique, such that it is different from a name of any other volume or backup of any other volume in the system, for example concatenating the volume unit address, which is a 4-digit number (uuuu) unique in the mainframe system, to a predefined 2-character prefix (pp) to create a 6-character unique name ppuuuu. For example, a volume located at unit address 6813 the name may be PF6813. However, in some embodiments, names may repeat such that backups may be overwritten on one another. For example, backups may be overwritten after one week, one year, or the like. The generated name may be stored in a repository for later use.

On step 212, the volume name of the copy may be renamed, for example by renaming service 132 to reflect the generated name. In MF systems, changing the volume serial number for a volume is referred to as reformatting the volume. Reformatting may be performed for an offline copy. The name of the original volume, the generated name and possibly additional details, such as the date and time of the backup may be stored in a repository such as name repository 126.

In some cases it may be required to keep the snapshot copy intact and identical to the original volume. For this purpose, some disk storage systems support taking snapshots copies of snapshot copies. Once a second snapshot copy is taken, it can be manipulated, for example have its volume name renamed using a system utility such as ICKDSF, without changing the first snapshot copy, thus allowing reliable usage of the first snapshot copy for quick recovery or for any other purpose.

For example, renaming may use the REFORMAT command of the ICFKDSF system utility, which is a specialized system utility for performing administrative functions on volumes. The exemplary code below demonstrates running ICKDSF REFORMAT to rename an offline volume:

```
//JOB1DSFR      JOB       ACCT#,SYSPROG,
TIME=NOLIMIT,REGION=0M,
  //NOTIFY=&SYSUID,MSGLEVEL=(1,1),
MSGCLASS=X
  //ICKDSF EXEC PGM=ICKDSF
  //SYSPRINT DD SYSOUT=*
  //SYSIN DD *
  REFORMAT UNIT(6813) VERIFY(CURNAM) VOLID
     (PF6813)
  /*
  //
```

On step 216, the copy may be brought online, since it now has a name different from the name of the original volume. Volumes may be brought online via the VARY system command, for example: VARY 6813,ONLINE.

On step 220, the copy may be backed up on an external storage device, such as external storage 140, via API 144. For example, the copy may be backed up by backup/restore service to external system 136, such as an open storage, as detailed in patent application no. U.S. Ser. No. 14/800,743 filed Jul. 16, 2015.

Figure 2B:
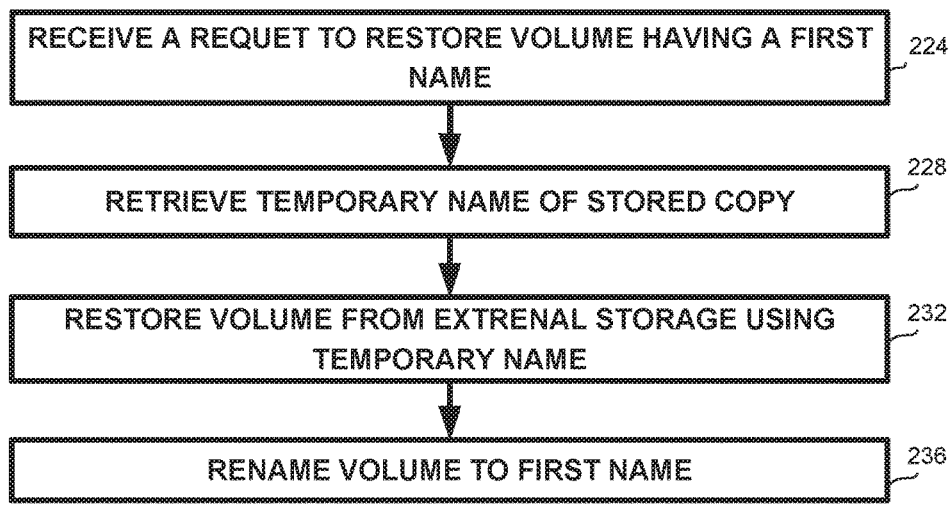
FIG. 2B is a flowchart of steps in a method for restoring a volume of a mainframe computer from an external storage, in accordance with some embodiments of the disclosure.

Referring now to FIG. 2B, showing a flowchart of steps in a method for restoring a volume of a mainframe computer from an external storage.

On step 224, a request for restoring a mainframe volume having a name may be received. The request may be received from a user, from an automatic process, or the like. The request may identify the volume to be restored by its original name and not another name which may have been assigned to the volume for the purpose of bringing it online or for any other purpose. The request may include the name of the volume to be backed up, and may also include identification of a specific backup to be restored, for example a date and time of a specific backup.

On step 228, a temporary name used for the backup may be restored, for example by renaming service 132, from name repository 126. If no specific identification of a backup is received with the request, then the name of the latest backup of the specified volume may be retrieved. If specific identification of a backup is received, the name of the backup complying with the specific identification is retrieved.

On step 232, the volume is restored from the external storage, using the name as retrieved on step 228. The backup may be restored by backup/restore service to external system 136, from external storage 140 using API 144, as detailed in patent application no. U.S. Ser. No. 15/800,743 filed Jul. 16, 2015.

On step 236, the restored volume may be reformatted to the original name provided with the request, for example by renaming service 132. Assuming that the original volume is absent, or is in offline state, the reformatting succeeds and the restored volume is in online state and can be accessed for reading or writing. If the original volume name exists and is online, the restored volume may be reformatted, and the user may be notified that the volume was left in an offline state by the restore process.

It will be appreciated that the steps of FIGS. 2A and 2B may be performed by software executed by a CPU of the MF.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    receiving a request for backing up a mainframe volume associated with a mainframe computer, the mainframe volume operating in a Count Key Data (CKD) architecture, the mainframe volume having a volume serial number, referred to as a volume name;
    taking a snapshot of the volume, thereby creating an offline copy of the volume;
    generating a temporary name for the offline copy, the temporary name different from the volume name;
    reformatting the offline copy to change its name to the temporary name;
    storing in a repository at least the name and the temporary name;
    bringing the offline copy with the temporary name to an online state; and
    backing up the offline copy to an external storage.

2. The method of claim 1, wherein the external storage is object storage.

3. The method of claim 1, wherein the temporary name is different from names of other volumes associated with the mainframe computer and from names of copies of volumes associated with the mainframe computer.

4. The method of claim 1, wherein the method is performed by a Central Processing Unit (CPU) of the mainframe computer.

5. A method comprising:
    receiving a request to restore a mainframe volume associated with a mainframe computer, the mainframe volume operating in the CKD architecture, the mainframe volume having a volume serial number, referred to as a volume name;
    searching a repository for the volume name to retrieve a temporary name;
    using the temporary name, restoring a volume from an external storage; and
    reformatting the volume to the volume name.

6. The method of claim 5, wherein the external storage is object storage.

7. The method of claim 5, wherein subject to availability of multiple backups for the volume, a required backup version is selected by a user.

8. The method of claim 5, wherein subject to the request comprising additional details of a backup, searching the repository comprises searching for an entry complying with the name and with the additional details.

9. The method of claim 5, wherein the method is performed by a CPU of the mainframe computer.

10. A system for backup and restore mainframe data on a backup server, comprising:
    a mainframe processor, the mainframe processor being adapted to perform:
        receiving a request for backing up a mainframe volume associated with a mainframe computer, the mainframe volume operating in the CKD architecture, the mainframe volume having a volume serial number, referred to as a volume name;
        taking a snapshot of the volume, thereby creating an offline copy of the volume;
        generating a temporary name for the offline copy, the temporary name different from the volume name;
        reformatting the offline copy to change its name to the temporary name;
        storing in a repository at least the name and the temporary name;
        bringing the offline copy with the temporary name to an online state; and
        backing up the offline copy to an external storage.

11. The system of claim 10, wherein the steps are performed by a CPU of the mainframe computer.

12. A computer program product comprising a computer readable storage medium retaining program instructions, which program instructions when read by a processor, cause the processor to perform:
    performing a backup operation, comprising:

receiving a request for backing up a mainframe volume associated with a mainframe computer, the mainframe volume operating in the CKD architecture, the mainframe volume having a volume serial number, referred to as a volume name;

taking a snapshot of the volume, thereby creating an offline copy of the volume;

generating a temporary name for the offline copy, the temporary name different from the volume name;

reformatting the offline copy to change its name to the temporary name;

storing in a repository at least the name and the temporary name;

bringing the offline copy with the temporary name to an online state; and backing up the offline copy to an external storage; and performing a restore operation, comprising:

receiving a second request to restore the mainframe volume associated with the mainframe computer, the mainframe volume operating in the CKD architecture, the mainframe volume having the volume serial number, referred to as the volume name;

searching the repository for the volume name to retrieve the temporary name;

using the temporary name, restoring the volume from an external storage; and reformatting the volume to the volume name.

13. The computer program product of claim 12, wherein the backup operation and the restore operation are performed by a CPU of the mainframe computer.

\* \* \* \* \*